Dec. 4, 1923.  
R. A. WHITTINGHAM  
VEHICLE BRAKE  
Filed Jan. 11, 1921  
1,476,314
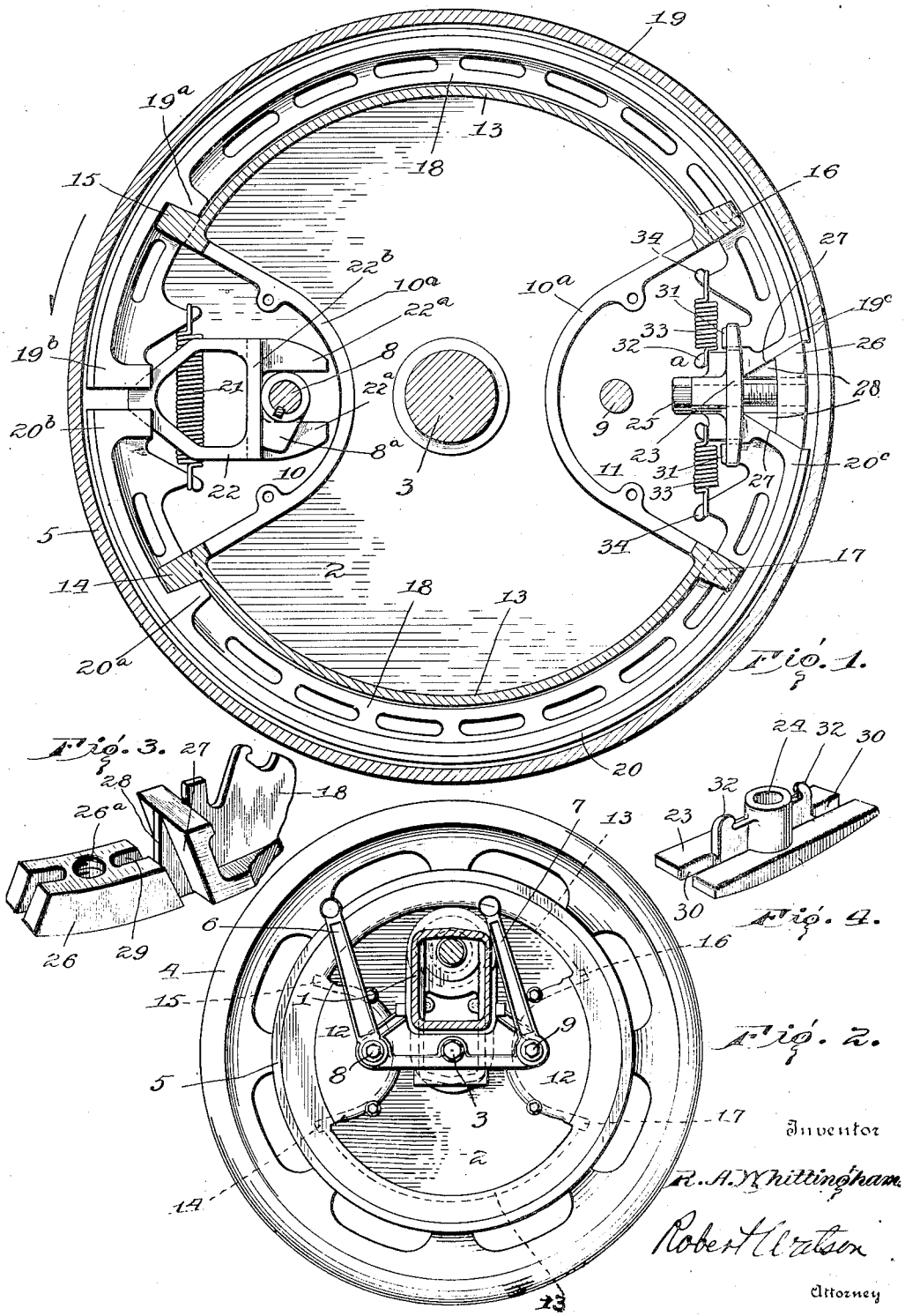

Patented Dec. 4, 1923.

1,476,314

UNITED STATES PATENT OFFICE.

RICHARD A. WHITTINGHAM, OF NEWARK, DELAWARE, ASSIGNOR TO ATLAS AXLE COMPANY, OF WILMINGTON, DELAWARE, A CORPORATION OF DELAWARE.

VEHICLE BRAKE.

Application filed January 11, 1921. Serial No. 436,565.

*To all whom it may concern:*

Be it known that I, RICHARD A. WHITTINGHAM, a citizen of the United States, residing at Newark, in the county of New Castle and State of Delaware, have invented certain new and useful Improvements in Vehicle Brakes, of which the following is a specification.

This invention relates to vehicle brakes, designed more particularly for motor driven trucks, but applicable also to various types of motor vehicles. The invention comprises a brake drum on the vehicle wheel, a support on the dead axle, and a split ring brake element, movable circumferentially on the support, within fixed limits, and comprising two shoes connected by a joint which is adjustable to take up wear of the ring, and means for spreading the open ends of the ring apart to expand the ring into engagement with the interior of the brake drum. The arrangement is such that when the ring is expanded into engagement with the rotating drum, by the operation of the brake lever, the friction of the drum tends to further expand the ring throughout its length, and thus a strong braking force may be applied to the drum with slight effort on the part of the operator.

In the accompanying drawing,

Fig. 1 is a vertical section through the brake drum and brake support shown in Fig. 2, showing a brake ring mounted on the support;

Fig. 2 is an inner side elevation of a truck wheel with brake drum attached, and the brake support, the latter being mounted upon an axle casing, shown in vertical section;

Fig. 3 is a perspective view of the adjusting wedge and the adjacent portion of one of the brakes shoes; and, Fig. 4 is a similar view of the yoke which forms a part of the joint between the shoes.

The present application is, in part, a continuation of my co-pending application, Serial No. 335,916, filed Nov. 5, 1919.

Referring to the drawing, 1 indicates the dead axle of a motor vehicle which, in this instance, is in the form of a housing, having at its end a disk-like body 2, which forms a support for the brake shoes. A spindle 3 is mounted in the axle casing and the traction wheel 4 is suitably mounted upon this spindle in any usual way, not shown. The traction wheel has a brake drum 5 on its inner side which surrounds the brake support. Brake levers 6 and 7 are secured to the brake shafts 8 and 9 and these shafts extend through pockets 10 and 11 in the brake support. These pockets are provided with suitable covers or closures 12, (Fig. 2) through which the brake shafts extend. One of the brake levers, by suitable connections to a hand lever adjacent the driver's seat, operates an emergency brake, and the other lever by similar connections to a foot pedal operates the other brake for ordinary control of the vehicle. The hand lever, foot pedal and their connections to the brake levers are well known and are not shown. The brake shoes operated by the different levers are alike in construction and therefore only the shoes operated by the lever 6 and brake shaft 8 are shown in detail in the drawing.

The brake support has two rim portions 13, parallel with the drum 5 and extending between the walls 10ª of the pockets. Ribs 14, 15, 16, and 17 project radially outward from the rim portions 13 at the points where said portions join the pockets, and these ribs are suitably grooved to receive the webs 18 of two semi-annular brake shoes 19 and 20. These brake shoes, which are T-shaped in cross section, are connected together at two of their adjacent ends by an expansion joint *a* and the shoes and joint are movable circumferentially on the support, as a unit, within fixed limits. As shown, the shoe 19 has an internal shoulder 19ª, adapted to engage the rib 15 on the support, and the shoe 20 has a similar shoulder 20ª adapted to engage the rib 14 on the support. These shoulders are normally held against the ribs by a spring 21, connected to the webs of the shoes adjacent their ends 19ᵇ and 20ᵇ. A wedge 22 is provided for wedging the ends 19ᵇ and 20ᵇ apart, and this wedge is provided with arms 22ª which straddle the brake shaft 8. The brake shaft carries a cam 8ª, which is adapted to bear against the back 22ᵇ of the wedge and force the latter between the adjacent brake shoes when the shaft 8 is turned to set the brake. The wedge 22, being loosely mounted on the shaft 8, may rock about the shaft and independently of it when the brakes are applied as hereinafter described.

The expansion joint *a* comprises a yoke 23, having a tubular boss 24 through which an adjusting screw 25 extends into a wedge block 26, the latter having a threaded opening 26ª to receive the screw. The ends 19ᶜ and 20ᶜ of the brake shoes are formed with inwardly converging walls 27 which fit against the ends of the wedge block and with fins 28, adapted to engage slots 29 in the wedge block. The yoke 23 rests upon the inner ends of the walls 27, and this yoke has notches 30 which fit over projections 31 on the wedges of the shoes. The yoke is also provided with hooks 32, and springs 33 connect these with hooks 34 on the webs of the shoes. With the arrangement described, the springs 33 hold the ends of the shoes against the wedge block and by turning the adjusting screw the wedge may be moved radially inward or outward to spread the shoes apart or to allow them to come closer together, and the fins upon the shoes, engaging the slots in the yoke and the wedge block, prevent the latter elements from turning or getting out of alinement with the shoes.

The shoes and the expansion joint *a* constitute a ring which is split between the ends 19ᵇ and 20ᵇ. The springs 21 and 33 constantly tend to contract the ring and hold it against the support and away from the brake drum, and the spring 21 causes the shoulders 19ª and 20ª to be held against the ribs 14 and 15, these ribs and shoulders constituting stops for the brake ring. The stops 15 and 19ª limit the circumferential movement of the ring in one direction only, and the stops 14 and 20ª limit the movement of the ring in the opposite direction only.

In operation, when the brake shaft 8 is turned to apply the brakes, the wedge 22 is forced between the open ends of the ring, and this causes an expansion of the ring and the stops 19ª and 20ª are moved in opposite directions, away from the shoulders 15 and 14. If the brake drum is not moving when the ring is expanded, the ring will be applied to the drum and the stops 19ª and 20ª will be held away from the stops 15 and 14. If the vehicle is in motion when the wedge is operated to apply the brakes, the ends of the ring will be forced apart, carrying the stops on the ring away from the stops on the support, until the ring is brought into frictional engagement with the drum. When this occurs, the entire ring is carried by the drum in the direction of its rotation until one of the stops on the ring engages the adjacent stop on the support, when the circumferential movement of the ring will cease and the friction of the drum applied to the ring will tend to cause further expansion of the ring and the application of a greater braking force. Thus, if the drum is rotating in the direction of the arrow, Fig. 1, when the wedge is moved outward to apply the brakes, the first effect of the movement of the wedge will be to force the open ends of the brake ring apart and expand the ring. When the ring is engaged by the drum, the friction of the drum, applied along the surface of the shoe 20 and thence along the shoe 19 to the stops 19ª and 15, will tend to further expand the ring and thus a heavy braking force will be applied to the drum by its own movement. The wedge 22, being loosely mounted on the shaft 8, may swing about the shaft as far as necessary to maintain its position between the open ends of the brake ring when the ring is moved by the drum. If the brake drum is moving in the direction opposite to that indicated by the arrow at the time the wedge is moved to set the brake, the friction of the drum applied along the surface of the shoe 19 and of the shoe 20 as far as the stops 20ª and 14, will tend to expand the ring and automatically apply pressure to the drum.

The expansion joint, which is a part of the brake ring and moves with it, is provided in order to take up wear of the shoe linings. Thus, when the shoes wear, the ring may be expanded by turning the bolt 25 so as to draw the wedge 26 radially inward and this will force the adjacent ends of the shoes apart and expand the ring.

Only one brake ring is shown in the drawing, but in practice two identical rings are employed, and these are reversely arranged, the open end of one ring being engaged by a wedge operated by the brake shaft 8, as shown, and the other being engaged by a similar wedge (not shown) operated by the brake shaft 9.

What I claim is:

1. In a vehicle brake, the combination with a brake drum, of a support within the drum, a split brake ring movable endwise on said support and comprising two shoes and an expansion joint connecting said shoes and movable with the shoes as a unit, means adjacent each end of the ring for limiting its endwise movement, and means for spreading the ends of the ring apart to expand the ring into engagement with the drum.

2. In a vehicle brake, the combination with a brake drum, of a support within the drum, a split brake ring having a limited endwise movement on said support and comprising two shoes and a wedge carried by and adjustable between the shoes, said wedge being movable with the shoes as a unit, and means for spreading the open ends of the ring apart.

3. In a vehicle brake, the combination with a brake drum, of a support within the drum, a split brake ring having a limited endwise movement on said support and comprising two shoes, a yoke supported upon adjacent ends of the shoes, springs connecting the shoes with the yoke, an adjusting screw carried by the yoke and a wedge between the shoes engaged by said screw, said yoke, springs, screw and wedge being movable with the shoes as a unit, and means for spreading the open ends of the ring apart.

In testimony whereof I affix my signature.

RICHARD A. WHITTINGHAM.